C. R. DAVIS.
SWEEP RAKE.
APPLICATION FILED JULY 26, 1916.

1,290,922.

Patented Jan. 14, 1919.
2 SHEETS—SHEET 1.

C. R. DAVIS.
SWEEP RAKE.
APPLICATION FILED JULY 26, 1916.

1,290,922.

Patented Jan. 14, 1919.
2 SHEETS—SHEET 2.

Inventor:
Calvin R. Davis

By Pond & Wilson
Attys.

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

SWEEP-RAKE.

1,290,922.  Specification of Letters Patent.  Patented Jan. 14, 1919.

Application filed July 26, 1916. Serial No. 111,516.

*To all whom it may concern:*

Be it known that I, CALVIN R. DAVIS, a citizen of the United States, residing at Rockford, in the county of Winnebago and State of Illinois, have invented certain new and useful Improvements in Sweep-Rakes, of which the following is a specification.

This invention relates to hay rakes, and has more particular reference to those known as sweep rakes.

The primary object of my invention is to provide a sweep rake of generally improved construction whereby the rake will be more effective and efficient in operation than rakes of this type now in use. To this end, I have aimed to provide an improved frame or head structure and draft means of novel construction in which I utilize the draft to hold the rake teeth in contact with the ground. As a result of the latter feature the rake teeth will be immediately forced below the hay when commencing to rake and during operation the teeth will be constantly urged into contact with the ground so as to positively follow the surface thereof and gather the hay in an effectual manner. Also by reason of this construction it is possible and practical to gather a larger load with a given sized rake than has been heretofore possible since the rake teeth will be held under the hay in contact with the ground when a large quantity of hay has been gathered and will not tend to rise above the hay on the ground as is the case with sweep rakes now in use.

The ordinary sweep rake is well adapted for gathering heavy compact hay or the ordinary timothy hay but is not capable of efficiently gathering alfalfa hay which is generally light, fluffy and in large quantities. In order to meet the varying conditions and requirements for actual usage in a practical and efficient manner my invention provides a head rail attachment adapted to be applied to a sweep rake to meet the requirements for gathering light, fluffy hay in large quantities.

Referring to the drawings in which I have illustrated one practical embodiment of my improvements,—

Figure 3:
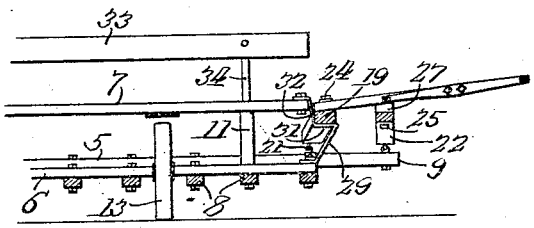
Fig. 3 is a fragmentary sectional view taken approximately on the line 3—3 of Fig. 1.
Figure 4:
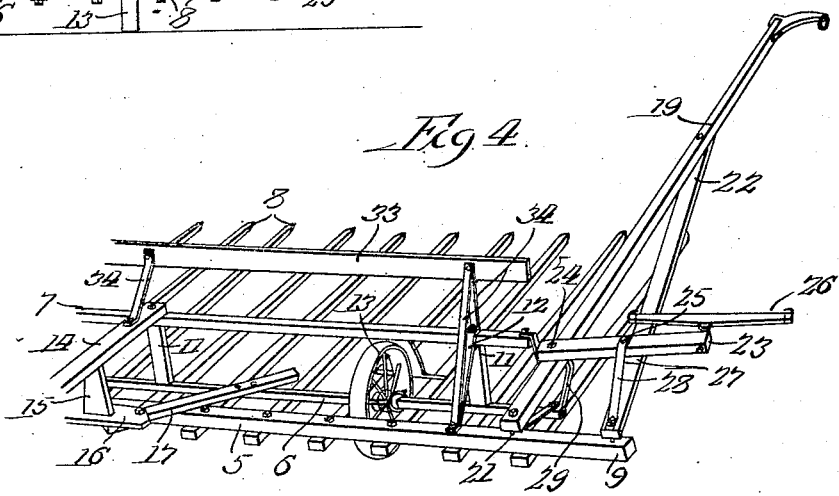
Fig. 4 is a rear quarter perspective view of one end of the rake.

The rake head proper and rake consists of a transverse head sill 5, an axle 6 disposed forwardly of and parallel to the head sill, a head rail 7 positioned directly above the axle and a series of rake teeth 8. The rake teeth 8 are bolted to the undersides of the head sill and axle in equally spaced relation and thus serve to rigidly tie together and hold in proper relation the head sill and axle. In the present instance, the axle is illustrated in the form of a square hollow metallic beam and the head sill as a wood beam. While this construction is preferable because of its simplicity, durability and cheapness, it should be understood that the invention is in no way limited to the particular shape or construction of these members. It will be noted viewing Figs. 3 and 4 that the ends of the axle terminate at the outermost rake teeth and that the end portions 9 of the sill project a substantial distance beyond the rake teeth. The head rail 7 of substantially the same length as the axle may be held in rigid relation thereto by means of blocks 11 interposed between and secured to the said rail and axle and by brace bars 12 connecting the head rail to the head sill. A pair of carrying wheels 13 suitably mounted on the axle support the rake head in a relatively low position as is well understood in the art. A suitable seat support may also be provided, and in the present instance I have shown a seat bar 14 secured at its forward end centrally to the head rail 7 and supported intermediate its ends by a block 15 mounted on a foot rest 16 in turn mounted on the forwardly diverging bars 17 secured to the head sill and axle. The seat 18 mounted on the seat bar may be capable of adjustment longitudinally thereon for the purpose of shifting the driver's weight with respect to the carrying wheels at different intervals in the operation as is ordinarily done.

The draft means provide for hitching a horse to each end of the rake so that the horses walk abreast of the rake teeth as is customary in sweep rakes. In the present instance, however, instead of employing the draft simply for draft purposes, I utilize it to control the operative position of the rake teeth in a very advantageous manner to effect certain desirable results, enabling more efficient operation of the sweep rake than can be obtained with sweep rakes now in use. In this connection the result sought is to positively maintain the points of the rake teeth in contact with the ground at all stages of the raking operation, so that when commencing to rake the teeth will be immediately forced under the hay and will not have the tendency to float above it because of not being weighted down by a large quantity of hay on the teeth and when traveling over uneven ground will be held in contact therewith so as to cleanly gather the hay, and at the final period of operation when a substantial quantity but not a complete load has been gathered the teeth will be urged down by a force additional to the weight of the hay thereon. At these three stages in the operation of sweep rakes now in use, it will be ordinarily found that because of the inherent construction of the rake and arrangement of the draft there will be a tendency for the teeth to skip portions of the hay when commencing to gather, and also when passing over slightly uneven ground to rise above the hay on the ground when a large quantity of hay has been gathered. This latter tendency is due mainly to the fact that as the load increases the draft correspondingly increases and effects a raising of the teeth. These objectionable features are overcome by the provision of my improved draft means in connection with the carrying wheels arranged as described on the rake.

Figure 1:
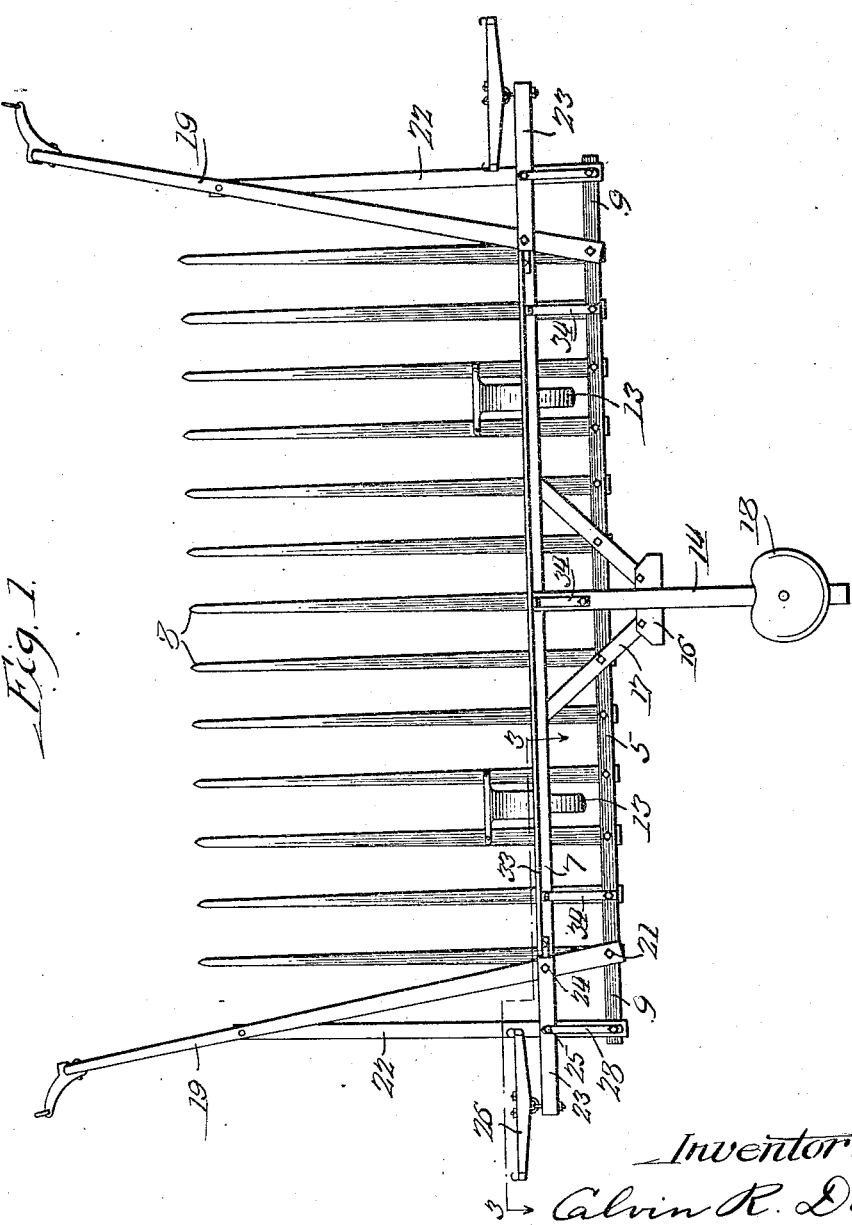
Figure 1 is a plan view of a sweep rake constructed according to my invention.
Figure 2:
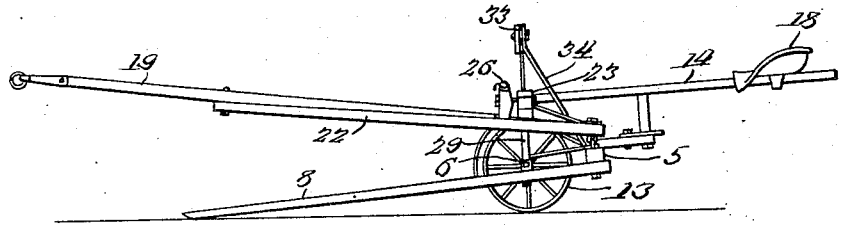
Fig. 2 is a side elevation of the rake.

The draft means at each end of the rake being similar, a description of that at one end of the rake will suffice for an understanding of the construction. A draft pole 19 pivotally connected at its rear end to the head sill 9 directly above the outermost rake tooth by suitable means such as eye bolts 21 projects forwardly and outwardly from the rake head as shown in Fig. 1 and is braced and held in this inclined position by a pole brace 22 secured at its front end to the pole and pivotally attached at its rear end to the outer end of the projecting sill portion 9. Thus the pole and brace may swing vertically upon their pivotal connections with the head sill and are held against lateral swinging movement by reason of their relative arrangement and mounting. Draft is applied to the tongue through means of a draft bar 23 arranged substantially in transverse alinement with the head rail 7 and mounted upon and rigidly bolted to the pole and pole brace by means of bolts 24 and 25. The draft bar, projecting outwardly beyond the pole brace 22, is equipped at its outer end with a swingletree 26 disposed substantially in longitudinal alinement with the hitching point at the front end of the pole 19. It will be noted that the outer end of the draft bar is elevated above its inner end by interposing a block 27 between the draft bar and pole brace so that the swingletree will be supported at the proper height. A draft brace 28 between the rear end of the pole brace and the draft bolt 25 holds the latter in upright position. The pole structure loosely rests upon and is held in operative position by a stop located at a point directly above the axle. This stop or rest is in the form of a brace rod 29 connecting and bracing the outer ends of the head rail 7 and axle 6 and is shaped to provide a horizontal seat portion 31 upon which the pole rests and an upright portion 32 against which the inner side of the pole abuts, as is clearly shown in Fig. 3. By means of this rest or stop the front end of the pole is maintained in a relatively high position as is shown in Fig. 2. Attention is called to the relative arrangement of the carrying wheels and the mounting of the draft means and it will be noted that the pole structure is pivotally mounted on the rake head at the rear of the carrying wheels' axis and loosely rests forwardly of said pivot on a part rigid with the rake head and preferably directly above said axis. When draft is applied and the rake is being drawn over the ground, the poles 19 will be held down onto the rests 31, and due to the relatively high position of these rests and of the pivotal mounting of the pole at the rear of the wheels, the draft on the poles and the weight thereof will tilt the rake tooth frame about the axle and urge the front end of the rake teeth into contact with the ground. This will be readily apparent as it will be seen that because of the relatively high and peculiar mounting of the pole structure the draft forwardly and somewhat downwardly will tend to rock the said pole structure on the axle 6 causing the rear end of the header to be raised or rocked upwardly on the carrying wheels, and consequently the forward ends of the rake teeth will be thrust downwardly. This has the effect of thrusting the rake teeth toward the ground and positively holding them in such position when the rake is being drawn forwardly, and it will be evident that as the draft increases, due to the increasing quantity of hay being gathered, the downward thrust on the rake teeth will be correspondingly increased. Thus as large a quantity of hay may be loaded on the rake teeth as is possible to be carried, and this may be done without skipping or passing over any of the hay on the ground. When the hay rake is backed away from the load to deposit the same either on the ground or on a stacker, the front ends of the poles will be raised by backing the horses, but this raising movement will not be transmitted to the rake teeth, because of the pivotal mounting of the poles and the fact that they are free to rise from the rests 31. Thus the rake teeth instead of being raised when backing the rake, and consequently tending to draw the hay with them, will simply follow the ground and draw out easily without disturbing the load.

Coming now to the improved attachment whereby the capacity of the rake may be increased, it will be seen that a top head rail 33 is detachably mounted on the rake head directly above the head rail 7. In the present instance, the top head rail is detachably secured by means of brackets or braces 34 to the head rail 7, head sill 5 and seat bar 14. This top head rail, positioned a substantial distance above the head rail 7, serves to enable a considerably greater quantity of hay to be gathered than is possible without the use of such top rail, since without its use the hay may roll over the head rail 7 if too great a quantity is gathered. The ordinary type of sweep rake of low structure such as might be characterized by applicant's sweep rake with the top head rail omitted is well adapted for gathering timothy hay or any hay that is comparatively heavy and compact. In the case of alfalfa hay, however, which is generally very light and fluffy and occupies a considerable amount of space when fresh a large quantity can not be gathered by the ordinary low structure sweep rakes. By means of my improvements, that is, the top rail attachment, a sweep rake may be provided for handling considerably larger quantities of hay than can be handled by the ordinary sweep rake and at a very small additional cost for the attachment.

I claim:

1. A sweep rake comprising a head having rake teeth, carrying wheels for the head, a pole pivotally connected at its rear end to each side of the head at the rear of the wheel's axis and free to swing vertically at its front end relatively to the head about its pivotal mounting thereon, a rigid abutment for each pole fixed to the head and upon which the pole normally rests at a point forward of its pivotal mounting and from which the pole is free to swing upwardly, and draft means connected to the pole and through which draft is applied to exert a down thrust on said abutment.

2. In a sweep rake, the combination with a wheel supported rake head having an outwardly projecting sill portion at each side of the head and at the rear of the wheel's axis, a draft pole pivotally attached to each of said sill portions a substantial distance within the ends thereof and resting on the rake head forwardly of the pole pivots, a brace bar pivotally attached at its rear end to the outer end of each of said sill portions and connected at its forward end to the adjacent pole, and a draft bar connected at its inner end to each pole and intermediate its ends to the adjacent brace bar and equipped at its outer end with a draft attachment.

3. In a sweep rake, the combination with a wheel supported head structure and rake teeth, of a pole structure pivotally connected at its rear end to each side of the head structure at the rear of the wheel's axis and normally resting at a point forward of its pivotal mounting on an abutment on the head structure, from which abutment the pole structure is free to swing vertically at its front end relatively to the head structure, and a draft bar fixed to each pole structure and arranged so that the draft will be transmitted to the head structure solely through the agency of the pole structure and will exert a down thrust on said abutment.

4. In a sweep rake, the combination of a frame including an axle and a head sill disposed rearwardly thereof, a series of rake teeth connected to the head sill and axle, the head sill having end portions projecting outwardly beyond the outermost rake teeth, a draft structure mounted on each projecting end portion of the head sill comprising a pole pivotally connected within the end thereof and so as not to interfere with the loading capacity of the rake, a pole brace pivotally connected to the head sill at the outer side of the pole and secured to a forward portion of the pole, the pole having contact with the frame forwardly of its pivotal connection thereto substantially directly above the axle, and a draft bar arranged transverse to the line of draft and connected to the pole and pole brace.

5. In a sweep rake, the combination of a head sill, an axle disposed forwardly thereof, a series of rake teeth connected to the head sill and axle, a head rail disposed above the axle, a support connecting the head rail and axle at each end thereof and shaped to provide a fixed seat upon which a pole may rest, and draft means at each end of the rake including a pole pivotally connected to the head sill and loosely resting on the adjacent seat so that the front end of the pole may be freely raised from said seat relatively to the rake teeth.

6. In a sweep rake, a frame structure upon which a series of rake teeth are mounted and including sills or the like projecting outwardly beyond the outermost rake teeth, a pole pivotally connected to each side of the frame structure so as not to interfere with the loading capacity of the rake, a pole brace pivotally connected to each extended sill at the outer side of the adjacent pole and secured to the forward portion of said pole, and a draft bar transverse to the line of draft connected to and carried wholly by each pole and its brace and projecting outwardly beyond the brace and equipped at its outer end with a draft attachment.

7. In a sweep rake, the combination of a frame equipped with a series of rake teeth, poles pivotally mounted on the frame substantially directly above the rear end of each outermost rake tooth and arranged to diverge forwardly so as not to interfere with the loading capacity of the rake, a pole brace pivotally mounted on the frame at the outer side of each pole and connected to the forward portion thereof, and a transverse draft bar connected to and carried wholly by each pole and its brace and projecting beyond the latter and adapted to be equipped at its outer end with a draft appliance.

8. In a sweep rake, the combination of a frame equipped with a series of rake teeth, poles pivotally mounted on the frame substantially directly above the rear end of each outermost rake tooth and arranged to diverge forwardly so as not to interfere with the loading capacity of the rake, a pole brace pivotally mounted on the frame at the outer side of each pole and connected to the forward portion thereof, a transverse draft bar connected to each pole and its brace and projecting beyond the latter and adapted to be equipped at its outer end with a draft appliance, and stops or seats on the frame for each pole disposed forwardly of and above the pivoted rear ends of the pole so as to maintain the same in an upwardly and forwardly inclined position with respect to the rake teeth and from which seats the pole may be freely raised at its forward end relatively to the teeth.

9. In a sweep rake, the combination of a frame structure equipped with a series of rake teeth and end portions projecting outwardly beyond the outermost rake teeth, a draft device mounted on each outer end of the frame structure including a pole pivotally connected to the frame substantially directly above or in proximity to the rear end of the outermost rake tooth and inclined forwardly and outwardly so that its forward end is disposed a substantial distance outwardly from said outermost rake tooth, a brace between the extended end of the frame and the pole, and a transverse draft bar mounted upon and carried wholly by the pole and its brace and equipped at its outer end with a draft appliance in substantially longitudinal alinement with the forward end of the pole.

CALVIN R. DAVIS.